INVENTORS
ROBERT H. FLANDERS ET AL
BY
Lyon & Lyon
ATTORNEYS

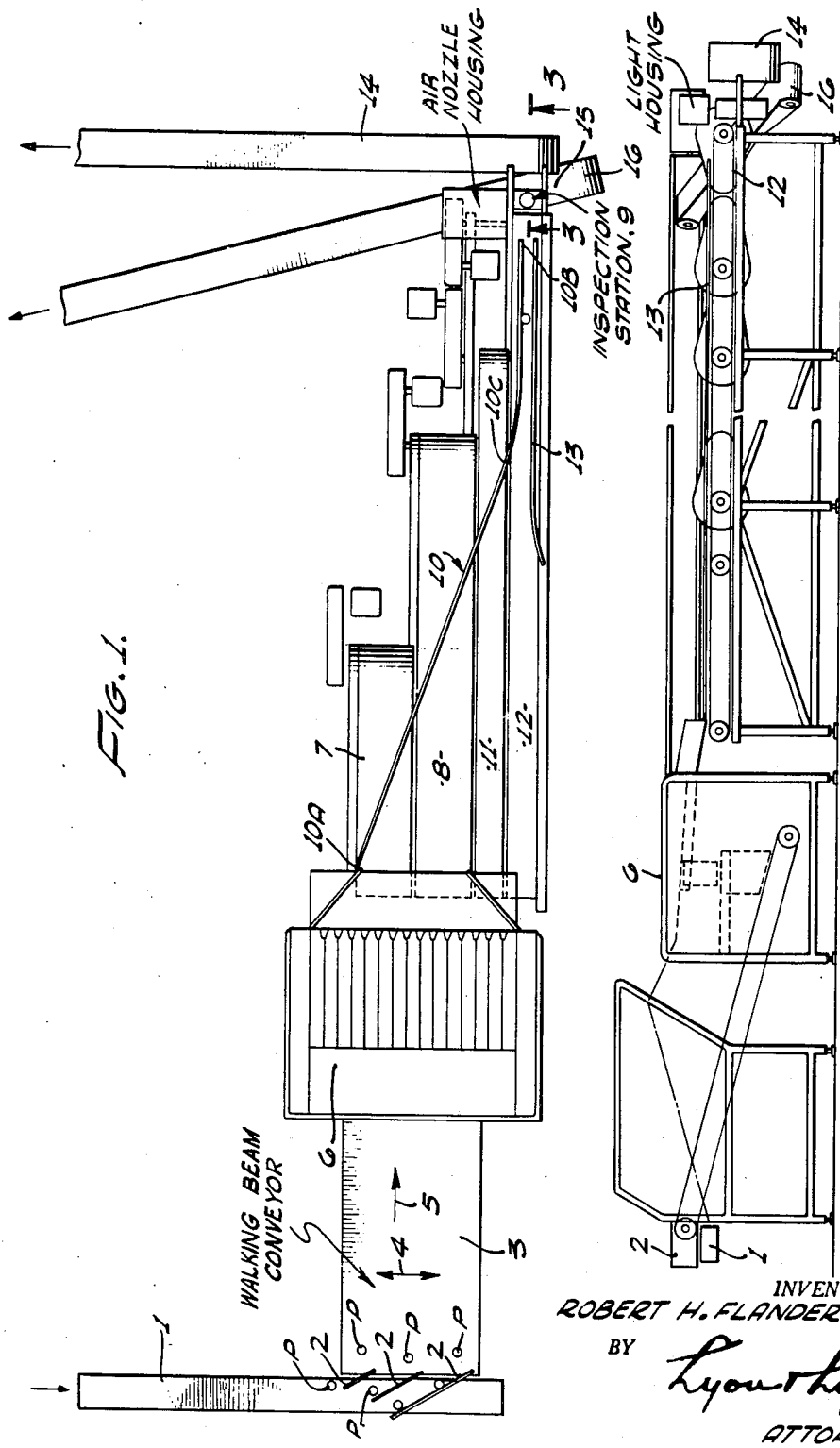

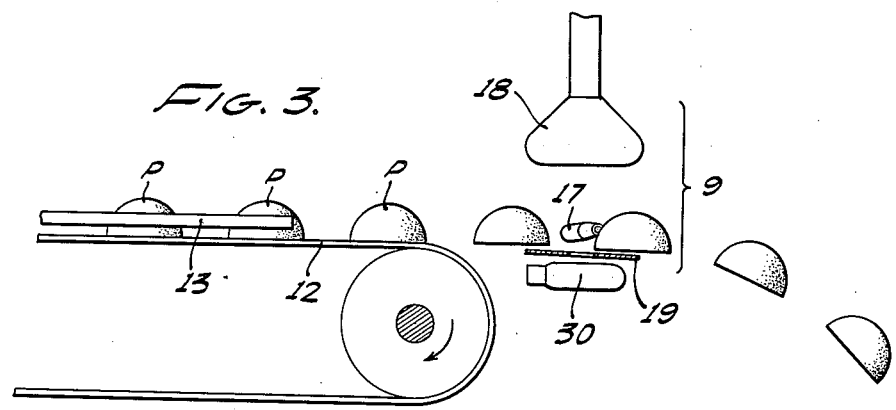
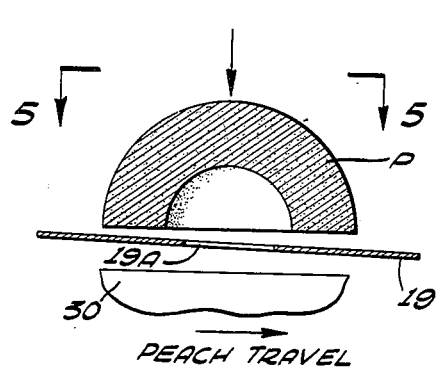
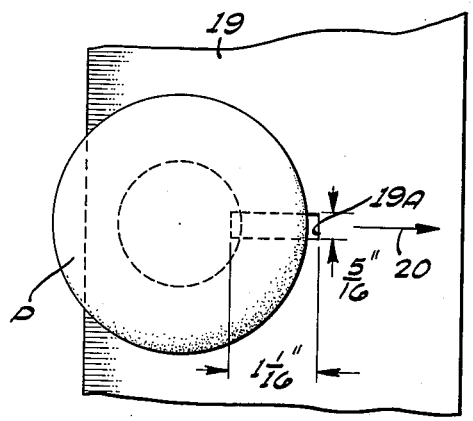
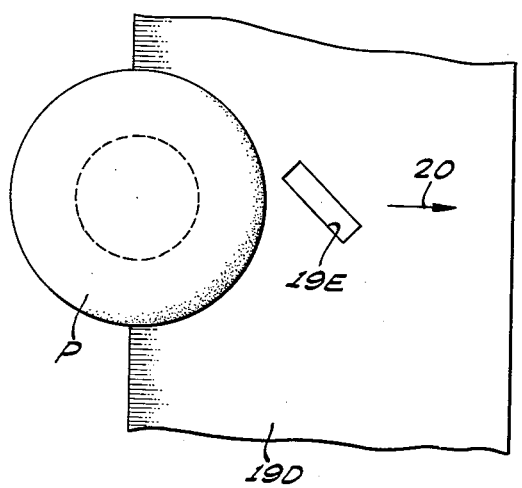

United States Patent Office 3,005,549
Patented Oct. 24, 1961

3,005,549
PEACH PIT FRAGMENTATION DETECTION
MEANS AND TECHNIQUES
Robert H. Flanders, Concord, John E. Dimick, El Cerrito, and Roy Amara, Redwood City, Calif., assignors to California Packing Corporation, San Francisco, Calif., a corporation of New York
Filed Aug. 16, 1956, Ser. No. 604,558
7 Claims. (Cl. 209—111.5)

The present invention relates to improved means and techniques for detecting the presence of a peach pit or fragments thereof in a peach half and for classifying the peach halves accordingly.

In peach canneries the peaches are usually cut in half by a saw, and the split peach pit is removed by a pitter, after which the outer skin is removed and the peach halves are then conveyed past inspection stations, at which peach halves are inspected for blemishes, discoloration, peach pits and fractions thereof prior to canning. Such inspection and removal of undesired peach halves, peach pits and fragments thereof are carried out manually as a result of visual observation.

The operation of the peach pitter, while satisfactory, is not 100% perfect, and as a result many of the peach halves still retain a peach pit half or a smaller fragment of a peach pit. This necessitates the employment of many inspectors, as indicated above, who visually inspect the peach halves for attached peach pit fragments.

The present arrangement serves to inspect each peach half, using radiation responsive means such as photoelectric means to develop a suitable control voltage when the peach half has attached thereto a peach pit fragment, and to use such control voltage to separate those peach halves having pit fragments attached thereto. The rate of inspection is indeed fast, amounting to approximately twenty peach halves per second. This rate of inspection, of course, may be increased since it is not limited by the electrical inspection process but by mechanical handling.

It is, therefore, a general object of the present invention to provide improved means and techniques for detecting the presence of peach pit fragments and to effect a classification of the peach halves according to whether or not a particular peach half has attached thereto a pit fragment or is free of any fragments.

A specific object of the present invention is to provide improved means and techniques of this character working on the principle of light transmission through the peach half.

Another specific object of the present invention is to provide improved means and techniques for classifying comestibles according to their translucency.

Another object of the present invention is to provide improved means and techniques of this character which are capable of effecting such classification at a high practical rate in the order of twenty per second.

Another specific object of the present invention is to provide improved means and techniques of this character involving the inspection of a comestible while in horizontal free flight, travelling at relatively high speeds in the order of 20 per second past an inspection station.

Another specific object of the present invention is to provide improved means and techniques which function to effect a classification of peach halves according to their translucency, notwithstanding the fact that a peach half inherently allows greatest radiation transmission therethrough in the direction of its fibers, and notwithstanding the fact that inspection is carried out with the peach half that inherently has a cup-shaped portion.

Another specific object of the present invention is to provide improved means and techniques for the purposes indicated that involve a special form of optical system for achieving the desired results.

Another specific object of the present invention is to provide improved means and techniques involving radiation responsive means controlling selecting means such that the radiation detection means does not effect operation of the selecting means when either there is no peach half in the inspection zone or when a peach half, free of a fragment, is in the inspection zone.

Another specific object of the present invention is to provide improved means and techniques for developing electrical pulses in response to peach halves having pit fragments attached thereto, and using such pulses to effect a classification.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIGURE 1 is a top plan view of apparatus embodying features of the present invention.

FIGURE 2 is a view in side elevation of the apparatus shown in FIGURE 1.

FIGURE 3 is a view taken generally on the line 3—3 of FIGURE 1.

FIGURE 4 is a sectional view illustrating the relationship between a peach half and the masking means and photocell, also illustrated in FIGURE 3.

FIGURE 5 is a view taken generally in the direction indicated by the lines 5—5 in FIGURE 4, but with the peach half displaced relative to slit 19A.

FIGURE 6 is a view similar to FIGURE 5 and illustrates a modified form of slit or radiation masking structure.

Figure 7:
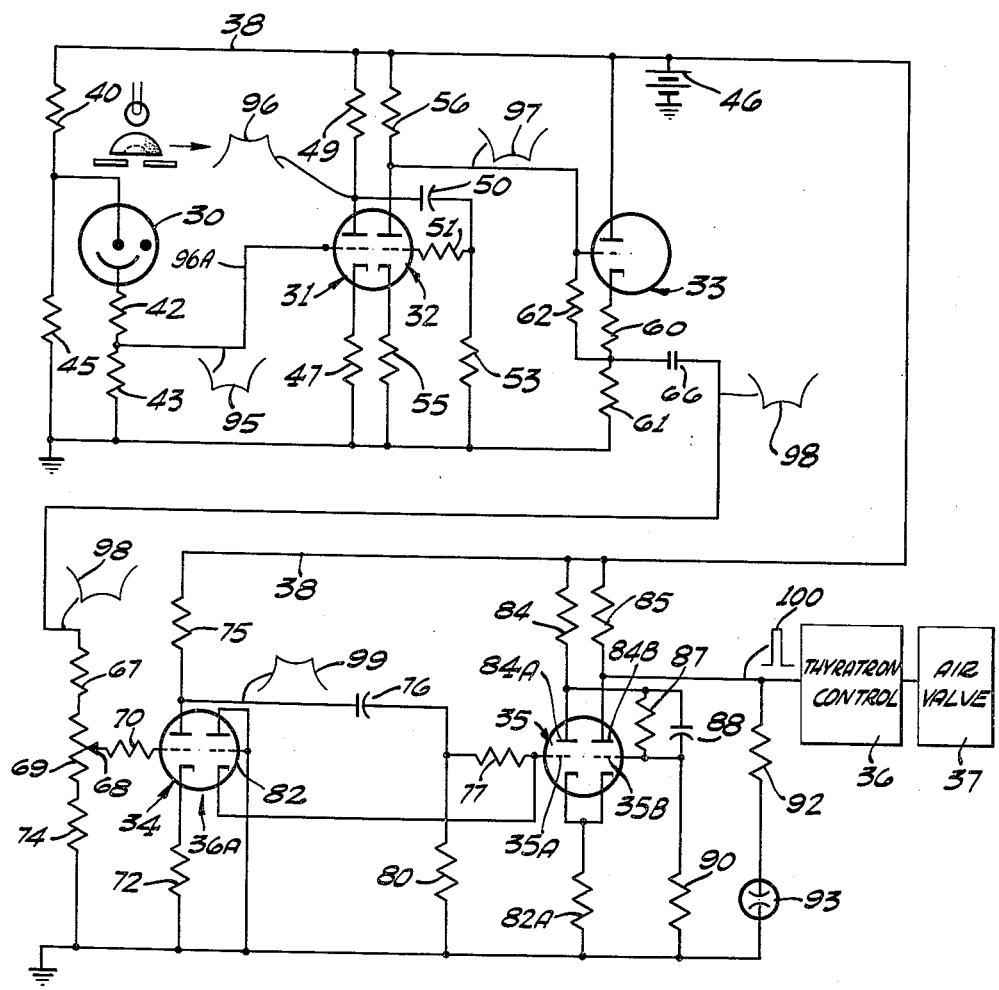
FIGURE 7 illustrates electrical circuitry connected to the photocell or radiation responsive means illustrated in connection with the previous figures.
Figure 8:
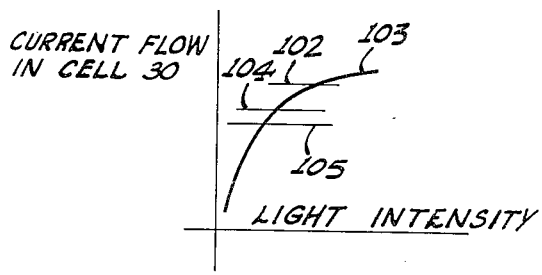
FIGURE 8 illustrates graphically the response characteristic of the photocell shown in the previous figures.

The present arrangement presupposes that peaches are cut or sawed in half by a conventional peach pitter which serves also to remove the cut peach pits and also fragments of the halved peach pits from most of the peach halves, while at the same time failing to properly remove the halved pits or fragments thereof from the other peach halves, as is usually the case in canneries functioning to can peach halves. Also, it is presupposed that the peach halves are unpeeled and wetted by water baths used in conjunction with operation of the peach pitter before being subjected to the inspection and classifying apparatus presently described. As a practical matter, the peach halves are sorted before peeling, but, if desired, sorting may be accomplished after the peach half is peeled.

Thus, the halved wetted peach halves P (some with peach pits, halved pits or fragments thereof still clinging to the peach half and the other peach halves free thereof) are loaded onto conveyor belt 1 from which they are deflected by deflecting plates 2 onto the so-called conventional walking beam conveyor 3, which is reciprocated generally in the direction indicated by the arrows 4 by conventional means (not shown and not forming a part of the present invention), so as to seek a uniform distribution of the peach halves P laterally of the conveyor 3, while at the same time the peach halves are being moved generally in the longitudinal direction of the belt 3, as indicated by the arrow 5. The peach halves leave the conveyor 3 and gravitate onto a so-called "cup down shaker" 6 which functions to convey the peach halves onto a plurality of conveyor belts 7 and 8 in cup down relation, and which may be a conventional form of apparatus adapted slightly for this intended purpose. The term "cup down" means that the flat side of the peach half rests on a conveyor with the convex side of the peach half facing upwardly.

All of the peach halves are transported in single file past the inspection station 9, preferably with a space between adjacent peach halves. For this purpose a peach half deflecting means, in the form of a circular tubular element 10, extending at an acute angle with respect to the movement of conveyor belts 7, 8, 11 and 12, is contacted by the peach halves so as to direct them in single file order towards the inspection station 9.

The tubular guide rail 10 extends generally from the point 10A to the point 10B and is straight between the points 10A and 10C, but has a curved portion between the points 10C and 10B. This tubular guide rail 10 thus directs the peach halves onto the belt 12.

The belts 7, 8, 11 and 12, while travelling at a constant speed, have different speeds. The belts 7, 8, 11 and 12 travel, respectively, at the rate of approximately 75 inches, 80 inches, 125 inches and 150 inches per second. The purpose of running these belts at different speeds is to achieve the desired separation between adjacent peach halves as they travel in single file order past or through the inspection station 9. The guide rail 10 comprises a circular rod or tube spaced about one-half of an inch above the upper surface of the belts 7, 8, 11 and 12.

A second rail 13 of the same size as rail 10 is spaced from the rail 10 to confine those particular peach halves which do not tend to be guided by the rail 10, although most of the peach halves continue in their movement while in rubbing engagement with the guide rail 10.

The belt 12, upon which all of the peach halves ultimately move in single file with a desired spacing between the same, terminates a slight distance before the inspection station 9, as clearly shown in FIGURE 3. This means that the peach halves, due to their acquired momentum, are projected in free horizontal flight when and as they leave the belt 12 and travel past or through the inspection station 9, at which they are inspected for whole pits, halved pits or smaller fragments thereof.

Those peach halves which are free of any whole pits, halved pits or fragments thereof continue their movement in generally a straight line and are collected on the conveyor belt 14, while those peach halves containing whole pits, halved pits or fragments thereof are deflected by a controlled air stream or blast in the general direction indicated by arrow 15 onto the endless conveyor belt 16, all in accordance with signals derived from sensing means located at the inspection station 9.

The particular means used for deflecting or rejecting the peach halves in the direction indicated by the arrow 15 includes a solenoid operated type of air valve 37, FIGURE 7, for projecting a blast of air through nozzle 17 onto the peach half while it is still in free flight.

The sensing means used in detecting a condition for controlling a voltage for operating the air valve involves generally a source of radiation 18, preferably one which emits radiation predominately in the infra red or red portions of the spectrum, for transmitting radiation through a peach half and radiation masking means 19, in the form of a slit, and onto a radiation responsive device 30, such as for example a photocell, the device 30 being predominantly responsive to radiation in the red or infra red regions of the spectrum, although it is understood, of curse, that satisfactory operation is obtainable when radiation in other portions of the visible spectrum is used.

The radiation masking means 19 is simply a metal plate having a slot or slit portion 19A. Preferably, such slit is generally rectangular, having dimensions 5/16 inch by 1 1/16 inch, with the longitudinal axis of the slit extending parallel to the direction of peach half movement, as indicated in FIGURES 3, 4 and 5. Also, the masking means 19D in FIGURE 6 may have a slit 19E of the same dimensions, with its longitudinal axis extending generally at an angle of as much as 30 degrees with respect to the direction of peach half travel, indicated by the arrow 20. It is considered that the slit should not be inclined more than 30 degrees with respect to the direction of peach half travel for good pit detection. Such inclination of 30 degrees is considered optimum since a greater area is scanned without too great a loss of sensitivity than is the case when the slit extends parallel to the travel of the peach half.

The general purpose of the masking means in each form shown in FIGURES 5 and 6 is to allow "observation" by the radiation responsive means 30 of only portions of the concave pit cavity in the peach half, in certain positions of the peach half during its travel. In other words, the radiation responsive means 30 is allowed to "see" only a portion of the pit cavity so as to allow concentrated inspection of the same for any pit fragment within the area being inspected, whereby rejection is accomplished when the pit fragment is indeed small.

The diameter of the average pit cavity is for the present purpose considered to be 1 1/2 inches, and the longest dimension of the slit is smaller than this dimension, namely, 1 1/16 inches. The peach halves need not necessarily be graded for size before being subjected to the inspection apparatus. With ungraded fruit, i.e., peach halves, the apparatus is capable of detecting pit fragments as small as one-third or one-quarter of original pit size, and this performance may be improved when the fruit is originally graded as to size, in which case this ratio is reduced to one-sixth or one-eighth pit size. However, it is noted that operation depends on the particular position of a pit fragment since the portion scanned is only a 5/16" band when using the slit system shown in FIGURE 3 and somewhat more when the slit system shown in FIGURE 6 is used.

Special problems are encountered in sensing pit fragments in peach halves using transmitted light due to the particular cross-sectional shape of the peach half and its light transmission characteristics, as well as the fact that the surface of the peach half is wetted and differs in degrees of ripeness. A peach half is essentially a fibrous structure with the fibres extending generally radially inwardly in the direction of the cavity portion, and radiation transmitted along the direction of the fibres is attenuated less than radiation transmitted in a direction extending perpendicular to the direction of the fibres. This relationship appears to be dependent on the frequency of the transmitted radiation, and best results for contrast purposes are considered to be achieved when, as mentioned above, the radiation is in the red or infra red region of the spectrum.

The detection method involves essentially the use of transmitted light to effect a contrast between on the one hand a peach half free of fragments, and on the other hand a peach half having a small pit fragment within the area scanned by the slit system. Such contrast is achieved using to advantage the light transmission characteristics of a peach half indicated above. Since the fibres extend radially inwardly toward the cavity and radiation attenuation is less in that direction, the cavity appears lighter when viewed with transmitted light than the area surrounding the cavity which appears darker than the cavity, in a degree depending upon the distance from the cavity, the darkness being more pronounced immediately adjacent the region which defines the cavity and degrades into lighter portions in accordance with distance from such region, and the peripheral edge appears light largely because the path length directly through the peach half is a minimum near the peripheral edge.

The obtainance of a cavity that appears light instead of dark is considered desirable. It is also desirable that the frequency of radiation used should be such that it penetrates through the peach half with a minimum of scattering while in transmission through the peach half to make it possible for a pit fragment to throw a darker shadow. For this reason infra red or red illumination is preferred. It is also considered desirable that the source of radiation uniformly illuminate the peach half. Preferably, the peach half, while being inspected by such transmitted light, is spaced approximately 3/16 inch above the masking plate 19, or closer, though it has been found that with peaches that allow excessively little light transmission, a greater space may be desirable.

For high speed operation, the air nozzle 17 in FIGURE 3 is oriented to project a blast of air that lifts a rejected peach half and to extend in the direction of peach half travel at an angle of approximately ten degrees with respect to a line which is perpendicular to undeflected peach travel.

The electrical circuitry involves the photocell 30 receiving transmitted light through a slit system. The photocell 30 is electrically associated with amplifying stages 31, 32, 33, 34, a pulse shaping circuit 35 involving diode 36A, a thyratron control circuit 36 and the solenoid operated air valve 37.

The photocell 30 has its anode connected to the positive lead 38 through the junction of a voltage divider network composed of resistors 40 and 45 connected in series from ground to lead 38, the cathode of cell 30 being returned to ground through the serially connected resistances 42 and 43. The positive lead 38 is connected to the positive terminal of source 46 having its negative terminal grounded.

The amplifying stage or tube 31 has its control grid connected to the junction point of resistances 42 and 43 and has its cathode returned to ground through resistance 47. The anode of tube 31 is connected to lead 38 through load resistance 49 and is also coupled through condenser 50 and resistance 51 to the control grid of tube or stage 32. The junction point of elements 50 and 51 is returned to ground through resistance 53. The cathode of tube 32 is returned to ground through resistance 55. The anode of tube 32 is connected to lead 38 through resistance 56 and is coupled directly to the grid of tube 33. The cathode of tube 33 is returned to ground through serially connected resistances 60 and 61, having their junction point connected to the control grid of tube 33 through resistance 62, and is also coupled to the control grid of tube 34 through circuitry which includes the coupling condenser 66, resistance 67, the adjustable tap 68 on resistance 69 and resistance 70. The anode of tube 33 is connected to positive lead 38. The cathode of tube 34 is returned to ground through resistance 72. The tap 68 is connected to ground through a selected portion of resistance 69 and resistance 74. The anode of tube 34 is connected to the positive lead 38 through resistance 75 and is also coupled through condenser 76 and resistance 77 to the control grid 35A of tube 35.

The control grid of tube 35 is returned to ground through resistances 77 and 80 and is also connected to the cathode of the diode or clamp tube 82, the anode and grid of tube 82 being grounded. Tube 35 is a dual triode having its two cathodes returned to ground through a common cathode resistance 82A and having its two anodes 84A, 84B connected to lead 38 through corresponding resistances 84 and 85. The anode 84A is connected to the control grid 35B through the shunt connected resistance 87 and condenser 88. The control grid 35B is returned to ground through resistance 90. The anode 84B is connected to the thyratron control circuit 36 and also to the series circuit including resistance 92 and neon lamp 93, one terminal of lamp 93 being grounded. The thyratron control 36 is in turn coupled to the solenoid operated air valve 37.

In operation of the electrical circuitry a diminution of light intensity below a predetermined level falling on photocell 30 causes the resistance of cell 30 to increase which in turn causes the voltage across resistance 43 to decrease as indicated by the negative pulse 95 on lead 96A. This pulse 95 is amplified by tube or stage 31 and appears in inverted form as a positive amplified pulse 96 on the anode of tube 31. This positive pulse 96 is amplified in stage 32 to develop the amplified negative pulse 97 on the control grid of the cathode follower stage 33 wherein the negative pulse 98 is produced at low impedance. Further amplification is accomplished in stage 34 for developing the positive pulse 99 applied to the pulse shaping circuit 35 which functions to produce the sharp positive pulse 100 that is applied to the thyratron control circuit 36 for firing the thyratron control. When the thyratron control is fired the air valve 37 is opened to release a stream of air for deflecting the peach half that caused the original pulse 95.

For these purposes the cell 30 is normally operated in close to what may be termed a saturated condition when no peach half is positioned between the radiation source and the cell 30. In such case the cell 30 is subjected to maximum light intensity, its resistance is lowest and the resistors 42 and 43 serve to limit the flow of current through the cell. This latter condition is indicated in the graph which shows light intensity are the abscissae and resulting current flow in cell 30 are ordinates. The horizontal line 102 associated with such graph 103 represents the condition when no peach half is present. The horizontal line 104 represents the light intensity or cell 30 when an acceptable peach half is positioned between the radiation source and cell 30; and the horizontal line 105 represents the condition when a peach half having a pit fragment is positioned between the source and cell.

It is noted that an acceptable peach half will produce a pulse of the character illustrated by the pulse 95, but in such case there is no pulse 100 since tubes 35A and 35B provide a type of pulse selection in that they are fired or are not fired, depending upon the intensity of the pulse. When a peach half having a pit fragment produces the condition indicated by the line 105, the pulse 99 is then sufficiently large in intensity to fire tubes 35A and 35B which in turn operate thyratron control 36 to produce a resulting deflection of such peach half having a pit fragment.

As alluded to previously, when the slit system is arranged as illustrated in FIGURE 5, only a very narrow portion of the pit cavity is scanned. In the development of the instant arrangement, slit systems have been used in which the slit extends perpendicular to the direction of peach half travel, with the slit being comparable in length to the diameter of the average pit cavity. In this latter case, the entire pit cavity was scanned but unfortunately it was found that the arrangement would not work with any real degree of success when the slit was thus positioned at right angles to the direction of peach half travel. The arrangement worked best when the slit extended parallel to the direction of peach half travel, as shown in FIGURE 5. However, in order to secure greater coverage, the slit is inclined at a thirty degree angle, as illustrated in FIGURE 6, in which case it is not too great a drop in detection sensitivity, while at the same time there is increased scanning coverage.

Initially it was not understood why the machine would work well when the slit was parallel to peach travel but would not work when the slit was perpendicular to peach travel. Since then, however, a theory has been developed which seems to give a logical explanation. The explanation is simply this: The photocell sees the light admitted by the slit, and, therefore, the circuit is activated so as to cause the air valve to operate only when the over-all light reaching the cell through the slit drops below a certain level. Immediately surrounding the pit cup lies a dark area. This dark area is caused by the fact that light does not easily penetrate through this point because this is the thickest portion of the peach and because the peach fibres run perpendicular to the direction of the light rays. With the slit extending perpendicularly to the direction of peach half travel and when the peach half reaches a point approximately ⅛ inch farther along in its travel (i.e., the point just before the slit begins to see the pit cavity), the slit views in large part only the dark area immediately surrounding the pit area. This means that the light level is so low that the peach is ejected. If the machine is set high enough so that this darkened area does not cause ejection, a small pit will not cause adequate drop in illumination to cause ejection.

On the other hand, when the slit is arranged as in FIGURE 5, the situation is this: As the peach progresses over the slit and just before the slit begins to scan the pit cavity, one end of the slit is not yet covered by the peach and is, therefore, subject to the full strength of the incident light. Accordingly, while the dark area immediately surrounding the pit is being scanned, the other end of the slit is exposed to bright light and this brightness compensates for the darkness preventing the total light reaching the photocell from falling too low. By the time the peach has passed along to a point where it completely covers the slit, a large proportion of said slit is scanning the pit cavity. The pit cavity is quite light because of the direction of the peach fibres and because it is one of the thinnest parts of the peach. Here again, because of the brightness of the pit cavity, the over-all light reaching the cell is at a high enough level to prevent activation of the circuit despite the fact that the dark portion immediately surrounding the pit cavity is being viewed. The machine is set at a point such that it will just barely not eject a good peach. Naturally, then, if a pit fragment is present, it will substantially reduce the light which would normally be reaching the cell through the slit, and this causes a sufficient drop in illumination to activate the circuit.

It follows from the foregoing that the machine is more sensitive to pits located immediately adjacent to the edge of the pit cavity. The reason for this is that unless the pit obscures the light reaching the photocell almost immediately as the slit moves into the pit cavity, there is an insufficient drop in illumination unless the pit is very large. This comes about because as the slit moves further and further into the pit cavity, the light pit cavity is presenting more and more light to the photocell and a larger and larger pit is required to cut the light level sufficiently to activate the circuit.

Other considerations involve the fact that while it may not be apparent to the naked eye, the area immediately surrounding the pit cavity is gray rather than black at least as compared to the shadow thrown by a pit fragment.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:
1. In a system for classifying comestibles, the steps including projecting said comestible in free horizontal flight, determining the translucency of such comestible while in free flight, and classifying said comestible in accordance with its translucency so determined in free horizontal flight.

2. In an arrangement of the character described for classifying a comestible, means for projecting said comestible in horizontal free flight, means for determining the translucency of said comestible while in free flight, and classifying said peach half in accordance with such determination of translucency.

3. In an arrangement of the character described for classifying a peach half having a pit fragment, an inspection station including a radiation source spaced from radiation detection means, means for projecting said peach half in horizontal free flight in the space between said source and detection means, and means responsive to the radiation from said source transmitted through said peach half and impinging on said detection means for classifying said peach half in accordance with its translucency.

4. In an arrangement of the character described for separating peach halves having pit fragments, an inspection station including a radiation source and radiation detection means spaced from said source and defining a path through which said peach halves are moved, means for moving said peach halves through said path with said peach halves being interposed in horizontal free flight between said source and detection means with the convex portion of said peach halves facing said source and with the cup-shaped portions of said peach halves facing said detection means, said detection means being sensitive to the radiation transmitted through said peach halves, peach half detecting means, means associated with said detection means for operating said deflection means when a pit fragment changes the radiation impinging on said detection means from said source.

5. In an arrangement of the character described for inspecting a peach half, a radiation source, radiation responsive means spaced from said source, radiation masking means interposed between said source and said responsive means for limiting the radiation impinging on said responsive means from said source, said masking means allowing light transmitted only from a selected region of the pit cavity of said peach half to impinge on said responsive means, and means for projecting said peach half in horizontal free flight between said source and said masking means.

6. In an arrangement of the character described for inspecting a peach half, means for transmitting radiation through the peach half, a photocell receptive to radiation transmitted through the peach half, means for projecting a peach half in horizontal free flight between said transmitting means and said photocell, electrical circuitry energizing said photocell, said circuitry incorporating means to produce a current saturation condition with respect to said photocell when no peach half is interposed between said source and said photocell, thyratron control means coupled to said circuitry and incorporating means for preventing operation of the control means unless energized with a pulse of intensity above a predetermined threshold value, said circuitry functioning to produce a pulse above said predetermined threshold value only when a peach half having a pit fragment impairs the transmission of light therethrough to relieve sufficiently said saturation condition.

7. In an arrangement of the character described, means for projecting a comestible in horizontal free flight along a predetermined path, means adjacent said path for deriving a signal as to the condition of said comestible while in said free flight, and air blast means operated in accordance with said signal for deflecting said comestible from said path while in free flight, said air blast means including a nozzle which is oriented to produce an air blast to lift said comestible slightly while in free flight, said nozzle being directed to produce an air blast which is directed in the direction of movement of said comestible at an angle of approximately 80 degrees with respect to said path.

References Cited in the file of this patent

UNITED STATES PATENTS

| | | |
|---|---|---|
| 1,943,278 | Thompson et al. | Jan. 9, 1934 |
| 2,132,447 | Stout | Oct. 11, 1938 |
| 2,190,563 | Horsfield | Feb. 13, 1940 |
| 2,205,397 | Drake | June 25, 1940 |
| 2,532,644 | Robinson | Dec. 5, 1950 |
| 2,646,880 | Frankel | July 28, 1953 |
| 2,696,297 | Matthews | Dec. 7, 1954 |
| 2,803,754 | Cox | Aug. 20, 1957 |
| 2,881,919 | Bartlett | Apr. 14, 1959 |

FOREIGN PATENTS

| | | |
|---|---|---|
| 504,683 | Great Britain | Apr. 28, 1939 |